United States Patent
Doelle et al.

(10) Patent No.: US 6,394,279 B1
(45) Date of Patent: May 28, 2002

(54) FLOTATION MACHINE FOR A FIBER SUSPENSION AND METHOD OF USING SAME

(75) Inventors: Klaus Doelle, Menasha; Werner Witek, Appleton; Oliver U. Heise, Menasha; Bangji Cao, Appleton, all of WI (US)

(73) Assignee: Voith Sulzer Paper Technology North America, Inc., Appleton, WI (US)

( * ) Notice: Subject to any disclaimer, the term of this patent is extended or adjusted under 35 U.S.C. 154(b) by 0 days.

(21) Appl. No.: 09/595,214

(22) Filed: Jun. 16, 2000

(51) Int. Cl.[7] .................................................. B03D 1/24
(52) U.S. Cl. ...................... 209/168; 209/170; 210/221.2
(58) Field of Search .................................. 209/168, 169, 209/170; 210/221.2, 221.1; 162/4

(56) References Cited

U.S. PATENT DOCUMENTS

| | | | | |
|---|---|---|---|---|
| 1,759,983 A | * | 5/1930 | Houston | |
| 3,452,869 A | * | 7/1969 | O'Neill | |
| 3,635,338 A | * | 1/1972 | Chemtob et al. | |
| 4,060,481 A | * | 11/1977 | Stoev et al. | |
| 4,088,716 A | * | 5/1978 | Stoev et al. | |
| 4,447,311 A | * | 5/1984 | Fowles et al. | |
| 5,465,848 A | | 11/1995 | Veh et al. | 209/170 |
| 5,518,580 A | | 5/1996 | Ortner et al. | 162/4 |
| 5,770,050 A | | 6/1998 | Trefz et al. | 209/170 |

FOREIGN PATENT DOCUMENTS

| | | | |
|---|---|---|---|
| GB | 712170 | * | 7/1954 |
| JP | 59-006978 | * | 1/1984 |

* cited by examiner

Primary Examiner—Thomas M. Lithgow
(74) Attorney, Agent, or Firm—Taylor & Aust, P.C.

(57) ABSTRACT

A flotation machine is provided which includes at least one flotation cell having an inner chamber. The fiber suspension is transported into the inner chamber, and a gas is injected into the fiber suspension within the inner chamber at a temperature below 20° C. to cause the wax to clump within the fiber suspension. The clumped wax is removed from the fiber suspension.

5 Claims, 2 Drawing Sheets

FLOTATION MACHINE FOR A FIBER SUSPENSION AND METHOD OF USING SAME

BACKGROUND OF THE INVENTION

1. Field of the Invention

The present invention relates to a machine for removing contaminants from a fiber suspension, and, more particularly, to a flotation machine used for removing contaminants from a fiber suspension.

2. Description of the Related Art

A paper-making machine receives a prepared fiber suspension and produces a fiber web, such as a paper web. The fiber suspension is prepared from a source of fiber, such as wood fiber, within a stock preparation system. The stock preparation system may include a flotation machine which is used to float contaminants to the top of the suspension for removal thereof. Typically, the fiber suspension is at a relatively high temperature as a result of the various mechanical forces which are applied thereto and chemical reactions which occur therein. Contaminants within the fiber suspension in the form of particulates, such as varnish particles, dirt, etc. are relatively unaffected by the higher temperature of the fiber suspension and may be adequately floated to the top of the fiber suspension for removal. However, contaminants within the fiber suspension may also be in the form of various waxes which are contained within recycled paper. The waxes are transformed into colloidal particles within the fiber suspension at the higher temperatures at which the fiber suspension is typically transported into the flotation machine. Accordingly, the flotation process within the flotation machine is ineffective to adequately remove the colloidal wax from the fiber suspension.

What is needed in the art is a flotation machine and corresponding method of operation which allow effective removal of wax contaminants within the fiber suspension.

SUMMARY OF THE INVENTION

The present invention provides a flotation machine which injects low temperature gas into the fiber suspension to cause clumping of the colloidal wax and thereby allow the wax to be floated to the top and removed.

The invention comprises, in one form thereof, a flotation machine for removing a contaminant from a fiber suspension, including a flotation cell having an inner chamber. At least one gas injector injects a gas into the fiber suspension within the inner chamber at a temperature below 20° C. to cause the wax to clump within the fiber suspension. A wax removal device includes an elongate element positioned at and configured to move along a top of the inner chamber to remove contaminants from the fiber suspension.

The invention comprises, in another form thereof, a method of removing wax from a fiber suspension. A flotation machine is provided which includes at least one flotation cell having an inner chamber. The fiber suspension is transported into the inner chamber. A gas is injected into the fiber suspension within the inner chamber at a temperature below 20° C. to cause the wax to clump within the fiber suspension. The clumped wax is removed from the fiber suspension.

An advantage of the present invention is that the wax within the fiber suspension is caused to clump, thereby allowing flotation and removal thereof.

Another advantage is that the clumped wax may be removed with different types of removal devices.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
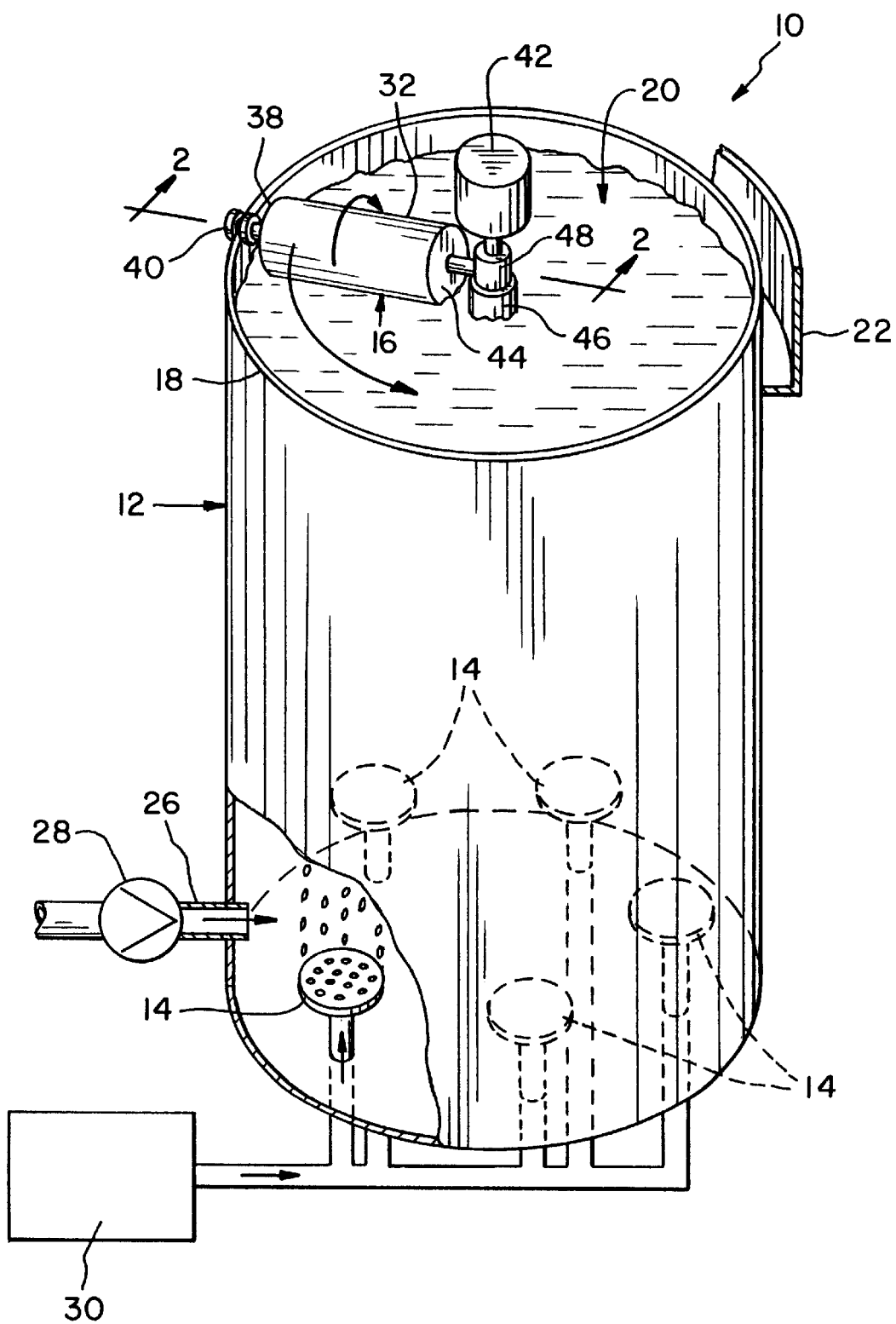
FIG. 1 is a schematic illustration of an embodiment of a flotation machine of the present invention, with which a flotation method of the present invention may be carried out.
Figure 2:
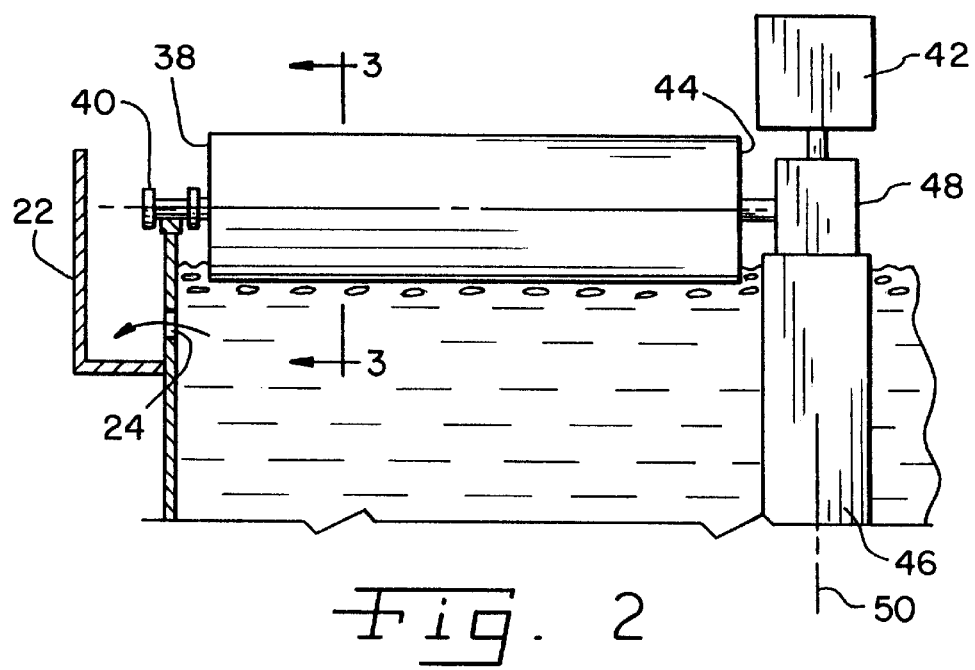
FIG. 2 is a plan view of the wax removal device shown in FIG. 1.
Figure 3:
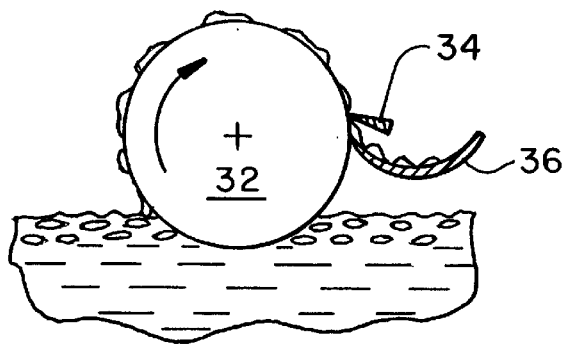
FIG. 3 is an end view of the wax removal device shown in FIGS. 1 and 2.

Referring now to the drawings, and more particularly to FIGS. 1–3, there is shown an embodiment of a flotation machine 10 of the present invention for removing contaminants from a fiber suspension. The contaminants may be in the form of wax, varnish particles, inks and/or stickies. Flotation machine 10 generally includes a flotation cell 12, a plurality of gas injectors 14 and a wax removal device 16.

Flotation cell 12 may have any suitable overall shape, and in the embodiment shown has a generally cylindrical shape. Moreover, a plurality of flotation cells 12 may be provided which are connected together, such as in a series manner to provide for sequential flotation and separation of contaminants within the fiber suspension. Flotation cell 12 includes a generally cylindrical top 18 and an inner chamber 20. Top 18 defines an overflow weir surrounded by an accept trough 22. A plurality of through-holes 24 extend through the upper portion of flotation cell 12 adjacent top 18, and are in communication with accept trough 22. Through-holes 24 are positioned below the level of fiber suspension within inner chamber 20, such that accepts flows through through-holes 24 into accept trough 22. For purposes of simplicity and clarity, trough 22 is shown in fragmentary form in FIG. 1 as only extending around a portion of the periphery of flotation cell 12. However, it will be understood that accept trough 22 in fact extends around the entire perimeter of flotation cell 12 at top 18.

Inlet 26 receives the fiber suspension which is processed within flotation machine 10. A valve 28 may be provided for controlling the flow of the fiber suspension into flotation machine 10.

Gas injectors 14 receive gas from a gas source 30. Each gas injector 14 is configured to discharge the gas into the fiber suspension within inner chamber 20, and preferably discharges the gas at the bottom of inner chamber 20. The gas, which may be in the form of air, carbon dioxide or other suitable gas, is below the temperature at which wax within the fiber suspension melts and forms colloidal particles within the fiber suspension. It has been found that the wax within the fiber suspension having a temperature at or above approximately 35° C. melts in the suspension. The temperature of the fiber suspension which is transported through inlet 26 into chamber 20 typically is at or above the onset melting temperature of the wax. By injecting a low temperature gas within the fiber suspension, the temperature of the fiber suspension is cooled to an extent causing the wax to clump or form spheres within the suspension. The wax clumps may then be floated to the top of flotation cell 12 and removed, as will be described hereinafter. Since the wax dissolves in suspension at or above 35° C., typically between 45° C. and 55° C., the gas which is injected into inner chamber 20 using the plurality of gas injectors 14 is at a temperature below 25° C.; preferably between −20° C. and 25° C.; more preferably between −20° C. and 10° C.; even more preferably between −20° C. and 0° C.; and yet more preferably between −20° C. and −10° C.

Gas injectors 14 are configured to provide relatively small air bubbles for floating the contaminants within the fiber suspension to the top of inner chamber 20 for removal by wax removal device 16. In the embodiment shown, gas injectors 14 are in the form of a plurality of pancake-type injectors with a relatively large surface area having a large number of outlet openings with a relatively small cross-sectional area. The number and size of the openings can of course be varied to tailor the size of the gas bubbles, depending upon the particular application.

Wax removal device 16, in the embodiment shown in FIGS. 1–3, includes a roll 32, plurality of doctor blades 34 and a trough 36. Roll 32 is positioned at the top of flotation cell 12 such that the bottom portion thereof is disposed within the fiber suspension during rotation. The wax and/or other contaminants within the fiber suspension sticks to the roll as the periphery thereof rotates through the fiber suspension. Doctor blades 34 scrape the contaminants from the outer surface of the roll, which then fall into trough 36 and are conveyed away via gravitational or mechanical forces.

Roll 32 has an end 38 which carries a roller 40. Roller 40 engages and is carried by the upper surface of top 18. A motor 42 is coupled with the opposite end 44 of roll 32. Motor 42 may be vertically supported using a column 46, or may be suspended from other support structure (not shown). Motor 42 is coupled with transfer case 48, which in turn applies an output forward motive force as well as a rotational force to roll 32 to both rotationally drive roll 32 as well as move roll 32 in a pivotal manner about the periphery of flotation cell 12. In other words, roll 32 pivots about a longitudinal axis 50 of flotation cell 12.

During operation, fiber suspension is transported into flotation cell 12 through inlet 26. The fiber suspension normally is at a consistency of between about 0.1 to 2%, and at a temperature above which wax in the fiber suspension is dissolved in the suspension. Low temperature gas, such as air or carbon dioxide, is injected into inner chamber 20 of flotation cell 12 to cool the fiber suspension and cause the wax dissolved therein to clump such as by forming Spheres of wax, etc. The low temperature gas is injected at a temperature below 20° C., preferably between −20° C. and −10° C. The bubbles caused by the low temperature gas float the wax and other contaminants to the surface of the fiber suspension at the top of inner chamber 20. The wax and/or other contaminants are removed by wax removal device 16 in the form of roll 32, doctor blades 34 and trough 36. The accepts is transported through through-holes 24 at the top of flotation cell 12 into accept trough 22 for removal and subsequent use. Motor 42 rotationally drives roll 32, and concurrently applies a pivotal motive force to roll 32 to cause roll 32 to pivot about longitudinal axis 50 of flotation cell 12. The pivotal movement of roll 32 about longitudinal axis 50 effectively removes the clumped wax and/or other contaminants from the top of the fiber suspension within flotation cell 12.

Figure 4:
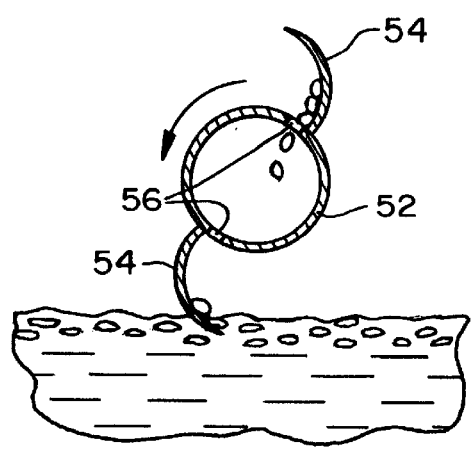
FIG. 4 is an end view of another embodiment of a wax removal device.

Referring now to FIG. 4, there is shown another embodiment of a wax removal device 16A for removing wax and/or other contaminants from the top of the fiber suspension within flotation cell 12. Wax removal device 16A is in the form of a pipe removal device including a pipe 52 and a plurality of blades 54. Pipe 52 is rotationally and pivotally driven by a motor 42, as described above with reference to roll 32 shown in FIGS. 1–3. The plurality of blades 54, in the form of a pair of blades, extend generally radially from pipe 52. Blades 54 have a curved shape which allows the clumped wax and/or other contaminants to be scooped from the top of the fiber suspension within flotation cell 12. As pipe 52 rotates, the wax and/or other contaminants move via gravitational force along the blade 54 towards pipe 52. Pipe 52 includes a plurality of apertures 56 through which the wax and/or other contaminants flow in a generally radially inward direction into pipe 52. The wax and/or other contaminants are then conveyed away from pipe 52 using mechanical force, such as an auger positioned within pipe 52, etc. The wax and/or other contaminants may be conveyed away from flotation cell 12 through column 46.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A flotation machine for removing a contaminant from a fiber suspension, comprising:

a flotation cell having an inner chamber and a generally cylindrical top;

at least one gas injector for injecting a gas into said fiber suspension within said inner chamber at a temperature below 25° C. to cause the wax to clump within said fiber suspension;

a vertical column generally concentrically positioned within said inner chamber; and a wax removal device including an elongate element positioned at and configured to move along a top of said inner chamber to remove contaminants from the fiber suspension, said elongate element comprising a roll, said roll having one end pivotally coupled to a top of said column and another end which is carried by and movable along said cylindrical top.

2. The flotation machine of claim 1, said roll including an end coupled with a motor for pivoting said roll relative to said cylindrical top.

3. The flotation machine of claim 1, including a plurality of doctor blades positioned in association with said roll for removing contaminants from said roll and a trough positioned in association with said doctor blades for transporting contaminants away from said roll.

4. The flotation machine of claim 1, said cylindrical top defining an overflow weir and further including an accept trough surrounding said overflow weir.

5. The flotation machine of claim 1, wherein said at least one gas injector comprises a plurality of pancake-type gas injectors.

* * * * *